SWITCHING CIRCUIT ARRANGEMENT

Original Filed Sept. 29, 1960

JAMES BERNARD Mc CARTHY CLIFTON
INVENTOR.

BY Rudolph J. Jusick
ATTORNEY

United States Patent Office 3,221,187

Patented Nov. 30, 1965

3,221,187

SWITCHING CIRCUIT ARRANGEMENT

James Bernard McCarthy Clifton, Wanamassa, N.J., assignor to The Bendix Corporation, Eatontown, N.J., a corporation of Delaware Continuation of application Ser. No. 59,217, Sept. 29, 1960. This application Oct. 22, 1963, Ser. No. 317,972
7 Claims. (Cl. 307—88.5)

This is a continuation of application Serial No. 59,217, filed September 29, 1960, now abandoned.

This invention relates to a switching circuit arrangement and more particularly to such an arrangement wherein the power loss in the switching device, or devices, utilized therein is minimized.

Switching circuits, which are widely used in electronic applications include one or more switching devices which are made to operate between "on" and "off" conditions. The "on" condition may be defined as the time during which the switching device is closed and the resistance thereof is relatively low, while the "off" condition is the time the device is open and the resistance is relatively high. With a switching device which is instantaneous in operation, i.e. one in which changes between the "off" and "on" conditions occur instantaneously, the power loss therein will be at a minimum since substantially no current flows therethrough when the voltage thereacross is maximum (during off conditions) and the resistance thereof is at a lowest value when the maximum current flows therethrough (during on conditions). As a practical matter, most switching devices are incapable of instantaneous operation, whereupon a relatively large current flows therethrough while the voltage thereacross is relatively high thereby resulting in a substantial dissipation of power therein. Generally, the power loss in the switching device limits the maximum power capabilities of the switching circuit.

The switching circuit of my invention is applicable for use with any switching devices which are not substantially instantaneous in operation, which devices include, for example, switchable semiconductor devices such as transistors, switchable diodes, thermionic vacuum tubes, gas-filled rectifiers with control grids, or the like. With my invention, the current flow through the switching device during switching from an "off" condition to an "on" condition is limited to a relatively low value by means of a saturable core reactor in the output of the switching circuit. The reactor presents a large reactance to the initial current flow through the switching device up to the time the core thereof becomes saturated. Hence, no current in excess of the magnetization current of the core flows until the core saturates. At saturation, the reactance reduces to substantially a zero level since substantially no further changes in flux therein are possible. The saturable core reactor may be chosen of such a value to provide the desired delay time substantially to correspond to the switching device under consideration, during which time the switching device functions in a transient region of operation.

In the detailed description hereinbelow, transistors are utilized in the illustrated switching circuits as the switching device. It will be understood that my invention is not limited to use with switching devices of the transistor type.

An object of this invention is the provision of a switching circuit in which the current through the switching device utilized therein is limited to a relatively small value durng switching from an "off" to an "on" condition.

An object of this invention is the provision of a switching circuit which includes a saturable core reactor in the output circuit thereof for limiting the current through the switching device to the magnetization current of the core until the core saturates.

An object of this invention is the provision of a switching circuit which includes a saturable core reactor in the output circuit thereof for limiting the current through a switching device to a relatively small value during switching from an "off" to an "on" condition, the said circuit including means for demagnetizing the core while the switching device is in an "off" condition.

These and other objects and advantages will become apparent from the following detailed description when taken with the accompanying drawings. It will be understood that the drawings are for purposes of illustration and are not to be construed as defining the scope or limits of the invention, reference being had for the latter purpose to the appended claims.

In the drawings wherein like reference characters denote like parts in the several views.

Figure 1:
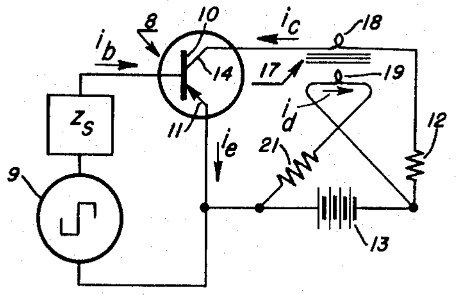
FIGURE 1 is a schematic circuit diagram of a switching arrangement having a half-wave output and illustrating my invention.

Reference is first made to FIGURE 1, of the drawings, wherein there is shown a switching device comprising a transistor 8 of the PNP type which transistor is included in a common emitter configuration switching circuit. A switching signal is provided by a square wave voltage source 9, having a source impedance $Z_s$, which source is connected between a control electrode such as the base 10 and the common electrode such as the emitter 11, which source provides alternate positive and negative pulses of a square shape; the negative input signal pulses driving the transistor to an "on" condition while the positive pulses drive the transistor to the "off" condition. A series connected load resistor 12 and D.-C. supply source 13 are connected between the transistor collector electrode 14 and emitter electrode 11, with the negative terminal of the source connected to the collector electrode 14 through the load to provide a reverse, collector-base junction bias.

In order to delay the flow of full output current in the output circuit of the switching device while switching from the "off" to "on" condition, I provide a saturable core reactor 17 in the output circuit. The reactor 17 comprises, preferably, an annular ring of saturable ferromagnetic material and a pair of "windings" 18 and 19. The main "winding" 18 is connected in series with the load resistor 12 and collector-base bias supply 13 and, therefore, carries the entire load current of the arrangement, comprising the transistor collector current, designated $i_c$. The reactor "winding" 19 is connected across the collector bias supply 13 through a series current limiting resistor 21, with the supply 13 providing a reverse biasing, or demagnetizing current $i_d$ for demagnetization of the reactor core during the time the output current is cut off. The degree, or amount, of demagnetization may be controlled by selection of the resistance value of the series resistor 21. Preferably, demagnetization is carried to saturation of the core in the other direction.

In the operation of the switching circuit of FIGURE 1, a positive input signal from the source provides a reverse emitter-base junction bias to cut off the transistor switching device. The transistor is switched to the on, or conducting, state with negative pulses from the source 9 which provide a forward emitter-base junction bias. During the transient time when switching from the cut off region of operation to the saturation region of operation of the transistor, the output resistance of the transistor is high, and if an increasingly large collector current is permitted to flow during such transient time, the power dissipated in the transistor is large. In my novel circuit, the saturable reactor 17 limits the collector current flow, during the transitory region of transistor operation when switching from an "off" condition to an "on" condition, to the magnetizing current of the reactor. Up to the time of saturation of the reactor core, the reactor impedance is relatively high (preferably higher than the transistor output resistance) whereby the reactor, in effect, absorbs the voltage drop which ordinarily would appear across the transistor. When the voltage-time integral of the reactor voltage reaches the saturation level of the reactor core, and the core saturates, the reactor impedance reduces to zero, and the full "on" condition transistor current begins flowing substantially instantaneously. The voltage-time saturation area of the saturable reactor which depends upon the number of turns of the "winding" 18, the cross-sectional area of the core, and the core material, is selected to maintain a low transistor collector current for a period substantially equal to the transient operating region when switching from "off" to "on" conditions. The demagnetizing current $i_d$ which flows through the "winding" 19 during the time the transistor is cut off produces a negative magnetizing force on the reactor core to demagnetize the core to a predetermined point on the magnetization curve of the said reactor.

Figure 2:
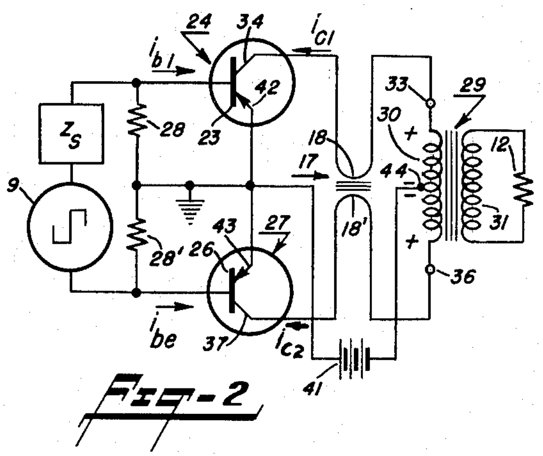
FIGURE 2 is a schematic circuit diagram of a push-pull type switching arrangement having a full wave output and illustrating my invention.

Reference is now made to FIGURE 2 of the drawings wherein there is shown a push-pull switching circuit in which one terminal of the square wave switching source 9 is connected to the control electrode such as the base 23 of a switching device comprising a transistor 24 while the other terminal of the source 9 is connected to the control electrode such as the base 26 of a switching device comprising a transistor 27. A pair of series connected resistors 28, 28′ are connected between the base electrodes 23 and 26 with the junction therebetween connected to a point of fixed potential, such as ground. An output transformer 29 having a center-tapped primary winding 30 and a secondary winding 31, is included in the output circuit, with the load resistor 12 connected across the said secondary winding 31.

One end terminal 33 of the primary winding 30 is connected to the output electrode comprising the collector 34 of the transistor 24 through one "winding" 18 of the saturable reactor 17, while the other end terminal 36 is connected to the output electrode comprising the collector 37 of the transistor 27 through a second "winding" 18′ of the reactor 17. A source of energizing potential illustrated as a battery 41 has the positive terminal connected to the junction between the interconnected common electrodes, or emitters 42 and 43 of the transistors 24 and 27, respectively, which junction is connected to the ground potential. The negative terminal of the source 41 is connected to the center tap 44 on the primary winding 30. The D.-C. source 41 provides the necessary reverse collector-base junction bias for transistor operation.

In the illustrated push-pull circuit, the transistors 24 and 27 conduct on alternate half cycles of the input signal, and the outputs from the transistors are combined in the secondary winding 31 of the output transformer 29. Thus, during one half cycle of the input signal, a reverse emitter-base junction bias is supplied to the transistor 24 to cut off the same while simultaneously a forward emitter-base junction bias is supplied to the transistor 27 to switch the same to the conducting state. Similarly, during the other half cycle of the input signal, the transistor 24 conducts while the transistor 27 is cut off. During initial flow of collector current designated $i_{c1}$ of the transistor 24, through the winding 18 of the reactor, the high reactor impedance limits the current to a small value whereby the power dissipated in the transistor 24 is small. When the core of the reactor magnetizes in one direction to saturation, the impedance reduces to substantially zero and full "on" condition current flows through the winding 18. Similarly, on the half cycle of the input signal during which the transistor 24 is cut off and the transistor 27 conducts, the collector current $i_{c2}$ of the transistor 27 flows through the winding 18′ of the reactor 17. The current flow $i_{c2}$ is in a direction to magnetize the reactor core in the opposite direction to the magnetization produced by the current $i_{c1}$ through the winding 18. Hence, it will be understood that the reactor core is alternately magnetized, first in one direction and then in the reverse direction. If the current flow through one winding 18, for example, is assumed to provide a positive magnetizing force, the current flow through the other winding 18 produces a negative magnetizing force. No demagnetizing winding is necessary in the push-pull arrangement, since the alternate transistor output currents supply both the magnetizing and demagnetizing forces. As in the FIGURE 1 circuit, the reactor 17 is chosen of such a size to maintain low initial transistor collector currents during the transient region of operation of the transistors as they are switched from "off" condition to "on" condition.

In one application of my invention wherein a saturable core reactor was included in the manner illustrated in FIGURE 2, the power dissipation within the transistor switching devices was reduced to one-third the power dissipated therewithin before the addition of such reactor. Hence, it will be apparent that the addition of a saturable core reactor in the output circuit of a switching device, or devices, will permit operation of the transistor at increased output currents. In addition, the lower losses in the switching device, or devices, permit operation of such device at higher temperatures than would otherwise be possible. Furthermore, in cases where the maximum temperature of the switching device in the absence of cooling means (such as thermoelectric coolers e.g.) become excessive, the cooling load on any cooling means used is substantially reduced with the arrangement of my invention.

Figure 3:
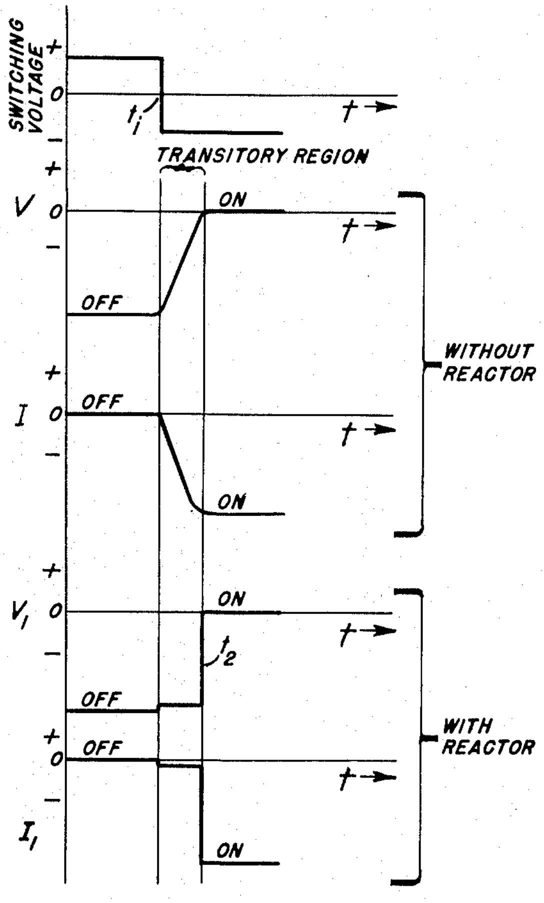
FIGURE 3 is a graph illustrating wave forms of outputs from switching circuits without my invention and also of circuits utilizing my invention.

Reference is now made to FIGURE 3 wherein the uppermost wave form on the graph illustrates a square wave switching signal, such as is obtained from the generator 9 of FIGURES 1 and 2. The graphs of voltage V and I therebelow illustrate typical wave forms of the voltage across a switching device and the current therethrough, respectively, as the switching device is switched from an "off" condition to an "on" condition in a typical prior art switching arrangement, such as would result if the reactor 17 were removed from the circuits of FIGURES 1 and 2. In such prior art arrangements, at the instant $t_1$ when the switching voltages changes polarity in one direction, the voltage V across the switching device changes from a negative "off" value to a zero "on" value over a period of time designated the "transitory region" of operation of the switching device. Simultaneously, in such prior art arrangement, the current I through the switching device increases from a zero "off" condition to a predetermined "on" condition value during the transient condition of operation. Simultaneous current flow through the switching device and voltage drop thereacross results in a substantial power dissipation within the switching device during such transitory region of operation. During the "off" condition, the current I through the switching device is substantially zero and during the "on" condition the voltage drop across the switching device is zero whereupon substantially no power is dissipated therein at such time.

The effect of a saturable core reactor in the output circuit of a switching device in the manner illustrated in FIGURES 1 and 2 is seen in the two lowermost wave forms of the graph shown in FIGURE 3. The voltage $V_1$ illustrates the collector-emitter voltage of any of the switching devices 8, 24 or 27, shown in FIGURES 1 and 2, while the current $I_1$ illustrates the collector current $i_c$, $i_{c1}$ or $i_{c2}$, respectively, thereof. When the switching device is in the "off" condition, the current $I_1$ is zero and a large voltage drop exists across the transistor. At the time $t_1$ when the switching signal changes polarity to place the switching device in condition for conduction, a small current flows through the switching device, the magnitude of which current is limited by the saturable core reactor in the output circuit. Once the core of the reactor saturates, the impedance thereof drops to substantially zero whereupon full output current flows through the switching device and the voltage thereacross substantially simultaneously reduces to zero. The reactor is chosen whereby the time $t_2$ at which the core thereof saturates substantially coincides with the termination of the transitory region of operation of the transistor, as illustrated.

Figure 4:
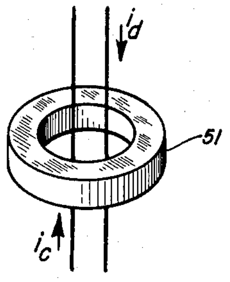
FIGURE 4 is a perspective view of a saturable core reactor of the type which is usable in the switching circuit of my invention.

The saturable core reactor 17, as shown in FIGURE 4, may comprise an annular ring 51 of a suitable ferromagnetic material. The "windings" therein may merely comprise portions of the appropriate lead wires of the switching circuit threaded through the opening in the ring. Thus, if the reactor of FIGURE 4 is to be utilized in the circuit of FIGURE 1, the connection between the collector 14 and load resistor 12 may comprise one "winding" while the lead wire connected to the resistor 21 may comprise the other "winding." The lead wires are passed through the ring of ferromagnetic material in the proper direction to provide for magnetizing and demagnetizing forces on the core. For the FIGURE 2 circuit, portions of the lead wires from the collectors 34 and 37 would comprise the "windings" of the saturable core reactor. Since no toroidal windings on the core are necessary, the reactance of such device reduces to substantially zero upon saturation of the core in either direction.

It will be understood that although PNP type transistors are shown in the preferred embodiments of the invention shown in FIGURES 1 and 2, NPN type resistors may also be used. If this is done, the polarities of the batteries must be reversed. Also, it will be understood that the common base or common collector configurations for the switching device transistors may be employed without departing from the spirit and scope of the invention. The input switching signal may comprise alternate negative and positive square wave pulses separated by predetermined intervals of zero potential, rather than the illustrated switching input signal which comprises positive and negative square wave pulses which are not separated by rest periods. These and various other changes and modifications will suggest themselves to those skilled in this art, and it is intended that such changes and modifications shall fall within the spirit and scope of the invention as recited in the following claims.

I claim:

1. A switching circuit of the class comprising a switch device having an input and an output circuit and operable from an off to an on condition through a transient region having a predetermined time period, a switching signal applied to the said input circuit thereby to switch said device from the off to the on condition, a load circuit connected to the said output terminals, a saturable core reactor having a winding in series connection with the load circuit; means including a magnetizing current to cause said reactor core to reach saturation within the said predetermined time period.

2. A switching circuit, comprising a switching device having input terminals and output terminals and operable from an off to an on condition through a transient region having a predetermined time period; a switching signal applied to said input terminals to switch the device to the on condition; an output circuit comprising a load and a source of electrical energy connected to the said output terminals; a saturable core having first and second windings; circuit elements connecting the first winding in the said output circuit, and means including the load current through said first winding producing a magnetizing force for saturation of the core within the said predetermined time period; a source of D.C. voltage; and circuit elements connecting the said second winding to the said source of D.C. voltage to demagnetize the core when the said switch is in the off condition.

3. The invention as recited in claim 2, wherein the switch device is a transistor and the switching signal has a substantially square wave form.

4. A switching circuit comprising a pair of switching devices, each switching device having input and output terminals and operable from an off to an on condition through a transient region having a predetermined time period; an alternating switching signal source; circuit elements connecting the signal source to the input terminals of both switching devices for alternately switching the devices from off to on conditions; an output circuit comprising a transformer having a center-tapped primary winding; a source of D.C. voltage connected between the center tap of the said primary winding and one output terminal of both switching devices; a saturable core having first and second windings; means connecting the said first winding between an end of the said primary winding and the other output terminal of one switching device; and means connecting the said second winding between the other end of the said primary winding and the other output terminal of the other switching device; means to cause the said core to become saturated first in one direction and then in the other direction within the said predetermined time period as one or the other switching device is operated from the off to the on condition by the said switching source.

5. A switching circuit comprising a pair of transistors connected in push-pull circuit, each transistor having output, control and common electrodes; a square wave signal source; means connecting the said signal source to both of the said control electrodes for controlling the electrodes in opposite senses for alternately switching the transistors from a cut-off region of operation to a saturated conducting region of operation; an output circuit comprising a transformer having a center-tapped primary winding; means connecting the common electrodes together; a D.C. supply source connected between the center tap on the primary winding and the said common electrodes; a saturable core having a first winding and a second winding; means connecting the said first winding between one end of said primary winding and the output electrode of one transistor; and means connecting the said second winding between the othe end of the said primary winding and the output electrode of the other transistor; means to cause said core to be driven to saturation in one or the other direction when one or the other transistor is operated from the cut-off to the conducting region, and the time period within which the core becomes saturated being not greater than the time period required for the associated transistor to operate from the cut-off region to the saturated conducting region.

6. A switching circuit comprising a switching device having input terminals and output terminals and operable from an off to an on condition through a transient region having a predetermined time constant; means for actuating said device from an off to an on condition, and current limiting means connecting to said output terminals to limit the current flowing across said device, said current limiting means having a time constant substantially similar to said predetermined time constant to offer a relatively large reactance to said current flow during said predetermined time constant and a relatively low reactance to said current flow at the end of said predetermined time constant.

7. A switching circuit comprising a switching device having input terminals and output terminals and operable from an off to an on condition through a transient region having a predetermined time period; a switching signal applied to said input terminals to switch the device to the on condition; a load circuit connected to said output terminals, and a current limiting device connected in series with said load circuit and responsive to the current flowing therein, said current limiting device initially offering a relatively high impedance and having a time constant so as to change the impedance of said device to a relatively low value at the end of said predetermined time period.

References Cited by the Examiner

UNITED STATES PATENTS

| | | | |
|---|---|---|---|
| 2,785,236 | 3/1957 | Bright et al. | 307—88 |
| 2,882,482 | 4/1959 | Simkins | 307—88.5—27 |

ARTHUR GAUSS, *Primary Examiner.*